(12) United States Patent
Tye

(10) Patent No.: US 11,518,904 B2
(45) Date of Patent: Dec. 6, 2022

(54) CURABLE COATING COMPOSITIONS

(71) Applicant: SWIMC LLC, Cleveland, OH (US)

(72) Inventor: Anthony J. Tye, Warrensville Heights, OH (US)

(73) Assignee: SWIMC LLC, Cleveland, OH (US)

( * ) Notice: Subject to any disclaimer, the term of this patent is extended or adjusted under 35 U.S.C. 154(b) by 5 days.

(21) Appl. No.: 16/581,810

(22) Filed: Sep. 25, 2019

(65) Prior Publication Data

US 2020/0095452 A1 Mar. 26, 2020

Related U.S. Application Data

(60) Provisional application No. 62/736,523, filed on Sep. 26, 2018.

(51) Int. Cl.

| | |
|---|---|
| *C09D 133/12* | (2006.01) |
| *C09D 129/12* | (2006.01) |
| *C09D 133/26* | (2006.01) |
| *C08K 3/013* | (2018.01) |
| *C08K 5/00* | (2006.01) |
| *C08K 5/09* | (2006.01) |
| *C08K 5/31* | (2006.01) |

(52) U.S. Cl.
CPC ......... *C09D 133/12* (2013.01); *C09D 129/12* (2013.01); *C09D 133/26* (2013.01); *C08K 3/013* (2018.01); *C08K 5/005* (2013.01); *C08K 5/0025* (2013.01); *C08K 5/09* (2013.01); *C08K 5/31* (2013.01)

(58) Field of Classification Search
CPC .... C09D 129/12; C09D 135/02; C08F 222/14
See application file for complete search history.

(56) References Cited

U.S. PATENT DOCUMENTS

| | | |
|---|---|---|
| 4,602,061 A | 7/1986 | Akkerman |
| 5,017,649 A | 5/1991 | Clemens |
| 5,132,367 A | 7/1992 | Chan |
| 5,219,958 A * | 6/1993 | Noomen ............... C08F 299/00 427/384 |
| 5,288,802 A | 2/1994 | Walters et al. |
| 5,332,785 A | 7/1994 | Brindoepke |
| 5,350,875 A | 9/1994 | Kumar et al. |
| 5,559,163 A | 9/1996 | Dawson et al. |
| 5,567,761 A | 10/1996 | Song |
| 6,521,716 B1 * | 2/2003 | Leake ................... C08G 81/00 525/421 |
| 6,740,359 B2 | 5/2004 | Kumar et al. |
| 7,396,429 B2 | 7/2008 | Beckley et al. |
| 8,609,885 B2 | 12/2013 | Malofsky et al. |
| 8,884,051 B2 | 11/2014 | Malofsky et al. |
| 8,962,725 B2 | 2/2015 | Brinkhuis et al. |
| 9,108,914 B1 | 8/2015 | Malofsky et al. |
| 9,181,365 B2 | 11/2015 | Malofsky et al. |
| 9,234,107 B2 | 1/2016 | Malofsky et al. |
| 9,249,265 B1 | 2/2016 | Stevenson et al. |
| 9,279,022 B1 | 3/2016 | Palsule et al. |
| 9,315,597 B2 | 4/2016 | Sullivan et al. |
| 9,328,191 B2 | 5/2016 | Tye et al. |
| 9,334,430 B1 | 5/2016 | Stevenson et al. |
| 9,416,091 B1 | 8/2016 | Sullivan et al. |
| 9,518,001 B1 | 12/2016 | Sullivan et al. |
| 9,523,008 B2 | 12/2016 | Malofsky et al. |
| 9,567,475 B1 | 2/2017 | Palsule et al. |
| 9,617,377 B1 * | 4/2017 | Palsule ................. C12P 7/62 |
| 9,683,125 B2 | 6/2017 | Tye |
| 9,718,989 B1 | 8/2017 | Palsule et al. |
| 9,752,059 B2 | 9/2017 | Malofsky et al. |
| 2006/0078742 A1 | 4/2006 | Kauffman et al. |
| 2013/0281580 A1 | 10/2013 | Malofsky et al. |
| 2013/0303719 A1 | 11/2013 | Malofsky et al. |
| 2014/0248485 A1 | 9/2014 | Malofsky et al. |
| 2014/0275400 A1 | 9/2014 | Chen et al. |
| 2014/0288230 A1 | 9/2014 | Malofsky et al. |
| 2014/0329980 A1 | 11/2014 | Malofsky et al. |
| 2015/0056879 A1 | 2/2015 | Malofsky et al. |
| 2015/0073110 A1 | 3/2015 | Malofsky et al. |
| 2015/0104660 A1 | 4/2015 | Malofsky et al. |

(Continued)

FOREIGN PATENT DOCUMENTS

| | | | |
|---|---|---|---|
| EP | 0580328 A2 * | 1/1994 | ........... C08G 63/918 |
| EP | 1321494 A1 | 6/2003 | |

(Continued)

OTHER PUBLICATIONS 1,8-diazabicyclo[5.4.0] undec-7-ene, ECHA, 2021, 1 page.*
*Polymeric Design by Macromonomer Technique*, Koichi Ito, Prog. Polym. Sci., vol. 23, 1998, pp. 581-620.*
International Search Report and Written Opinion for International Application No. PCT/US2019/052856 dated Dec. 20, 2019, 9 pages.
Sartomer Emea; "Technical Data Sheet—CN112C60 Novolac Epoxy Acrylate Oligomer diluted with 40% of TMPTA"; https://emea.sartomer.eom/en/product-finders/product/f/sartomer_Epoxy_EMEA/p/cn112c60/.
Brinkhuis, et al. "Taming the Michael Addition Reaction" European Coatings Journal, May 2015, 7 pages.

*Primary Examiner* — Brieann R Johnston
(74) *Attorney, Agent, or Firm* — Honigman LLP

(57) ABSTRACT

Described herein are two-component curable compositions for coatings, paints, primers, topcoats, and the like. The systems herein include curable components that permit a wide latitude in additional additives used in the product formulation. In one aspect, the curable components of the compositions include a first component of polymer(s) or oligomer(s) having a beta-dicarbonyl group or dicarbonyl functionality of 1 or greater combined with a separate, second component of polymer(s) or oligomer(s) having an alkylidene malonate functionality of 1 or greater in the presence of a catalyst or initiator and other acidic compositional components.

19 Claims, No Drawings

(56) References Cited

U.S. PATENT DOCUMENTS

2016/0229786 A1    8/2016   Sullivan et al.
2018/0094143 A1    4/2018   Wehner et al.
2018/0100069 A1    4/2018   Wehner et al.
2018/0112098 A1    4/2018   Wehner et al.
2021/0139624 A1    5/2021   Lindquist et al.

FOREIGN PATENT DOCUMENTS

| | | | | |
|---|---|---|---|---|
| EP | 3085748 A1 | | 10/2016 | |
| GB | 2335424 A | * | 9/1999 | ................ C08F 8/32 |
| WO | 9841561 A1 | | 9/1998 | |
| WO | 2005111105 A2 | | 11/2005 | |
| WO | 2016016637 A1 | | 2/2016 | |
| WO | 2016166369 A1 | | 10/2016 | |
| WO | 2016169543 A1 | | 10/2016 | |
| WO | 2016169544 A1 | | 10/2016 | |
| WO | 2016169545 A1 | | 10/2016 | |
| WO | 2018187430 A1 | | 10/2018 | |
| WO | WO-2019140154 A1 | * | 7/2019 | ............ C08F 220/18 |

\* cited by examiner

CURABLE COATING COMPOSITIONS

CROSS-REFERENCE TO RELATED APPLICATION

This application claims the benefit of U.S. Provisional Application No. 62/736,523 filed Sep. 26, 2018, which is incorporated herein by reference in its entirety.

FIELD

This application generally relates to two-part curable compositions, and in particular, two-part curable compositions based on Michael addition reactants.

BACKGROUND

Polyurethanes are a class of polymers widely used in foams, fibers, coatings, and sealants. In the field of coatings, two-component polyurethanes are often used in automotive coatings and paints, architectural coatings and paints, aerospace coatings, topcoats, primers, tanks liners, or can coatings to suggest but a few applications. Polyurethanes are widely used in such applications due to their strong physical and/or chemical properties.

Polyurethanes are often obtained via a reaction product of an isocyanate and a polyol. Isocyanates are a family of highly reactive, low molecular weight chemicals including toluene diisocyanate (TDI), methylene bisphenyl diisocyanate (MDI), hexamethylene diisocyanate (HDI), naphthalene diisocyanate (NDI), diisocyanate dicyclohexyl urethane and the like. Due to concerns with proper handling and safety when using the isocyanates, complex handling, storage systems, and use procedures are often required to safety utilize this raw material. For example, engineering controls like closed systems with proper ventilation are often required when using isocyanates. In other applications, special equipment such as respirators and/or protective clothing are typically recommended when handling such materials.

In view of the additional complexity with the use and handling of isocyanates, many alternative non-isocyanate materials and products are being developed. However, depending on the application or use, these alternatives tend to have shortcomings resulting in the non-isocyanate generated products having performance, processing, and/or attribute tradeoffs from the traditional isocyanate-generated materials.

One such alternative for two-component curable coatings involves the use of the Michael addition reaction between a component containing Michael acceptors such as acrylate groups and a component containing Michael donors such as β-dicarbonyl groups. While providing an isocyanate-free alternative to a two-part curable coating, such chemistry has performance and processing tradeoffs when applied in compositions for coatings, paints, primers, topcoats, and the like. In particular, the chemistry cures very well under highly basic conditions, but product formulations for many coatings, paints, primers, and/or topcoats often include additional additives that tend to be acidic or have acidic treatments that, in some instances, may poison the ability of this alternative chemistry to cure or cure fully. Acidic components in the formulations changes the basicity of the system to a point where the chemistry will not react or not react to its fullest extent. In one example, many coatings and paints commonly include organic and/or inorganic pigments as part of the final formulations. These pigments may have surface treatments or other conditioning with an acidic nature that can poison the prior non-isocyanate formulations. In other instances, volatile acids, such as acetic and/or propionic acids, or non-volatile acids like benzoic acid may be added to the formulation as rheology aids to maintain pot life and/or viscosity. Another common additive in coatings and paints are UV absorbers such as benzotriazole-based and the like compounds. These additives typically have a lower pKa that would affect conventional Michael addition cure. Such components impact the curing reaction of this alternative chemistry by lowering formulation pH to a level hindering the reaction. Thus, any two-component coating formulation using the alternative chemistry tends to be limited to compositional componentry that has a sufficiently high pKa in order to permit the curing reaction to complete.

SUMMARY

In one approach, a curable composition is described herein including a first and second cure component. In one aspect, the first cure component is a polymer or oligomer having a dicarbonyl functionality of 1 or greater provided by a moiety on the polymer or oligomer having the structure of Formula I

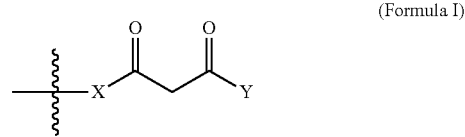

(Formula I)

wherein X is a heteroatom linker to a polymer or oligomer backbone (or bivalent linking group including one or more heteroatoms); Y is $-OR_1$ or a $-C1$ to $-C4$ hydrocarbyl group; and $R_1$ is a C1 to C20 hydrocarbyl group (with the wavy line indicating a bond to a polymer or oligomer backbone or portion of a backbone). The second cure component is another polymer or oligomer having an alkylidene malonate functionality of 1 or greater provided by the structure of Formula III

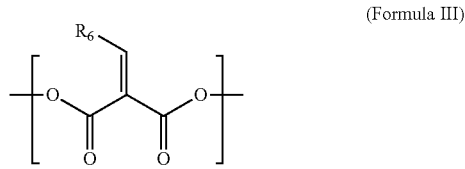

(Formula III)

wherein $R_6$ is hydrogen, a C1 to C9 alkyl group (in other approaches, a C1 to C6 alkyl group), or an aryl group. The curable composition may also include a catalyst or initiator.

In other approaches or embodiments, the curable composition of the previous paragraph may be combined with one or more optional features in any combination thereof. These additional features include any one or more of the following: wherein the composition includes, in some approaches, optional additives having a pKa less than about 12, less than about 10, or less than about 8; and/or wherein the dicarbonyl structures are selected from the moieties of Formula Ia, Formula Ib, or mixtures thereof:

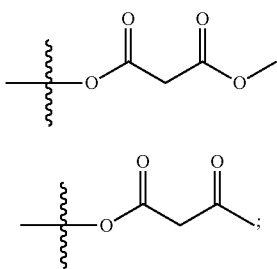

(Formula Ia)

(Formula Ib)

and/or wherein the first cure component is a polymer or oligomer having the structure of Formula II:

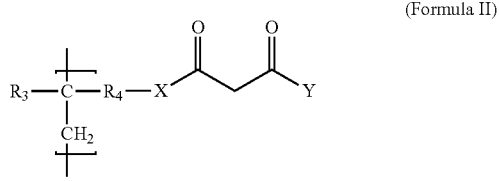

(Formula II)

wherein $R_3$ is a hydrogen or a linear, branched, or cyclic C1 to C4 hydrocarbyl group; $R_4$ is a linear, branched, or cyclic C1 to C4 hydrocarbyl linking group or an ester group of the structure —C(O)O$R_5$— with $R_5$ being a C1 to C4 linear, branched, or cyclic hydrocarbyl group; and/or wherein monomers to form the polymer or oligomer forming the first cure component are selected from the group consisting of acetoacetoxyethyl (meth)acrylate; acetoacetoxypropyl (meth)acrylate; acetoacetoxybutyl (meth)acrylate; allyl acetoacetate; 2,3-di(acetoacetoxy)propyl methacrylate; and mixtures thereof; and/or wherein the alkylidene malonate functionality of the second cure component has the structure:

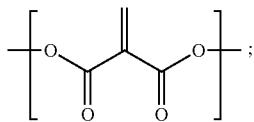

and/or wherein the polymer or oligomer having the dicarbonyl functionality further includes acrylic monomer units, vinyl monomer units, polyester monomer units, polycarbonate monomer units, polyepoxyester monomer units, polyurethane monomer units, or mixtures thereof; and/or wherein the polymer or oligomer having the alkylidene malonate monomer is a condensation product of a dialkyl alkylene malonate and a diol or polyol, such as a diethyl methylene malonate and 1,4-butanediol; and/or wherein the catalyst or initiator is polymeric or oligomeric; and/or wherein the catalyst or initiator is selected from compounds and/or polymers from the group consisting of guanidines, amidines, hydroxides, alkoxides, oxides, tertiary amines, alkali metal carbonates, alkali metal bicarbonates, alkali metal phosphates, alkali metal hydrogen phosphates, phosphines, alkali metal salts of carboxylic acids, alkali silicates, tetra methyl guanidine (TMG), 1,8-Diazabicyclo(5.4.0)undec-7-ene (DBU), 1,5-Diazabicyclo(4.3.0)non-5-ene (DBN), 1,4 diazabicyclo (2.2.2)octane (DABCO), tertiary butyl ammonium hydroxide (TBAH), sodium hydroxide, potassium hydroxide, sodium methoxide, sodium ethoxide, tri potassium phosphate, calcium oxide, triethylamine, sodium carbonate, potassium carbonate, sodium bicarbonate, potassium bicarbonate, potassium hydrogen phosphate (mono-basic and di-basic), triphenyl phosphine, triethyl phosphine, sodium silicate, potassium acetate, potassium acrylate, potassium octanoate, and combinations thereof; and/or wherein the catalyst or initiator has a pKa of about 12 or less, about 10 or less, or about 8 or less (or ranges therebetween); and/or wherein a volatile and/or a non-volatile acid is added to adjust pot-life and/or cure properties; and/or wherein the volatile acid is selected from acetic acid, propionic acid, or combinations thereof; and/or wherein the non-volatile acid is selected from benzoic acid, ethylhexanoic acid, or combinations thereof; and/or further comprising organic pigments, inorganic pigments, or combinations thereof; and/or wherein the pigments have an acidic surface treatment; and/or further comprising components having a pKa between one of about 3 and about 12, about 3 and about 10, about 3 and about 8, or about 3 and about 7; and/or when cured, further comprising good chemical resistance and cure properties (such as in one embodiment over about 200 MEK double rubs) in only a short amount of time, such as after about 24 hours of ambient cure; and/or further including inorganic pigments having an acidic surface treatment; and/or further including benzotriazole-based UV absorbers; and/or wherein the composition is applied to a substrate having an acidic surface content.

DETAILED DESCRIPTION

Described herein are two-component curable compositions, such as isocyanate free, two-component curable compositions for coatings, paints, primers, topcoats, and the like. The systems herein include curable components that permit a wide latitude in additional additives used in the product formulation. For example, rather than requiring a highly basic system to initiate cure as in prior systems, the compositions herein include select two-component curable polymers and/or oligomers that may react even in the presence of one or more acidic additives having a pKa of about 12 or less, in other approaches, about 10 or less, in yet other approaches, about 8 or less, and in even further approaches, about 7 or less. Even with such acidic formulation components, the compositions herein cure when exposed to the initiator or catalyst, demonstrate good pot life, and achieve a rapid full cure. In yet other instances, the compositions herein may also cure when applied to substrates having an acidic surface or acidic surface treatments and still achieve a rapid full cure.

In one aspect, the curable components of the compositions herein include a first component of polymer(s) or oligomer(s) having a beta-dicarbonyl group or dicarbonyl functionality of 1 or greater (preferably, greater than 1, such as 2 or greater, 3 or greater, or in some approaches, 3) combined with a separate, second component of polymer(s) or oligomer(s) having an alkylidene malonate functionality of 1 or greater (preferably, greater than 1) in the presence of a catalyst or initiator and other acidic compositional components. Upon initiation, the beta carbon of the dicarbonyl functionality from the first component reacts with an alkylidene carbon of the second component through a Michael addition reaction to form a cross-linked polymer matrix. In some approaches (and not wishing to be limited by theory), the compositions herein may also achieve a dual cure where homopolymerization may occur with the alkylidene malonate moieties cross-linking with itself combined with the Michael addition cure of the beta dicarbonyl functionality with the alkylidene carbon of the second component. Even with the presence of acidic additives in the final product composition, the uniquely selected curable components sufficiently cure via the Michael addition reaction scheme and also surprisingly demonstrate excellent pot life and an unexpectedly rapid full cure.

Glossary of Terms

As used herein, "Opacity" or hiding (in some approaches) generally refers to the ability of a film to scatter light based on the thickness of the film. The Opacity is often expressed as S/mil and may be in the form of Kubelka-Munk scattering coefficients as determined using a modification of ASTM D 2805-70 as described in J. E. Mchutt and H. L. Ramsay in American Paint and Coatings Journal, April, 1988, p. 46 by the weight drawdown method, which is incorporated herein by reference.

"Opaque Polymer," if used in the formulations herein, generally refers to a polymeric network that encloses or substantially encloses a defined void volume. In some embodiments an Opaque Polymer comprises polystyrene. Opaque polymers are commercially available from commercial vendors. Exemplary commercially available Opaque Polymers are Ropaque Ultra EF or Ropaque OP-96 EF (both available from the Dow Chemical Company, Midland, Mich.). In certain embodiments the defined volume of an Opaque Polymer comprises air forming a void that scatters light. For embodiments including a liquid within the defined volume, the liquid is eventually replaced with air, creating a void that scatters light. Opaque polymers may be used as a partial replacement for $TiO_2$ in paints or other coatings to enhance hiding and whiteness in paints and coatings.

"Pigment Volume Concentration" or "PVC" as used herein refers to a number that represents the volume of pigment (e.g., opaque polymer, titanium dioxide, and/or extender pigment particles) compared to the volume of all solids. In the field of paints and coatings, PVC is a useful measure because the Binder acts as the material to unite all the pigment and other raw materials into the paint and the PVC value ensures there is enough Binder to enable the paint to adhere properly to whatever it has been applied over in addition to containing all of the other components of the paint. If a paint has no pigment at all it will usually be very glossy and have a PVC of zero. An example is clear gloss paints. Flat paints have a very high pigment loading and have high PVCs (usually in the range from about 35% up to about 80%). Another non-limiting exemplary range of PVC in which pigment can be loaded is from about 60% to about 75%. Primers and undercoats vary from 30% to about 50% PVC as do semi-gloss, satin and low sheen paints. PVC may be expressed as a percentage. For example, if a coating has a PVC of 30, then 30% of the total binder and pigment blend is pigment and 70% of the total binder and pigment blend is binder solids on a volume basis.

"Binder" as used herein refers to long chain molecules, or polymers, that are film-forming materials. Binders are generally responsible for gluing or binding coating materials together and to the substrate. Latex polymers are a non-limiting example of a Binder that may be dispersed in water using a dispersant and film formation (or other network formation) occurs by joining (or coalescence) of these solid particles as water evaporates or is otherwise driven off. Exemplary Binders which may be used in the present disclosure include, but are not limited to, polyvinyl acetates, vinyl acrylics, styrene butadiene, styrene acrylics, ethylene vinyl polymers and copolymers or terpolymers as further discussed herein. In some approaches, the copolymers and terpolymers herein function as a paint binder and no further binder is utilized.

"Paint" as used herein refers to any mixture comprising different types of raw materials, each with its own function, which must be balanced to achieve the desired properties in the final product or film coating. The two primary functions of paint are decoration and protection. A paint may contain a solvent (which can include a volatile component derived from a petroleum distillate for a solvent-based paint, or a low VOC, or no-VOC, or water for a water-based paint), a Binder, a pigment, fillers (such as an extender or a plurality of extenders of different sizes) and an additive, which may impart different functionality to the paint or final coating. Embodiments may include a pigment cluster as a component thereof, optionally in combination with at least one of the solvent, Binder, pigment, filler and additive.

"Coatings" as used herein refer to compositions such as paint, stains, lacquers, topcoats, sealants, etc.

"Additives" as used herein refer to a general category of components or other raw materials that may be added to the coatings herein to promote various properties. Examples include, but are not limited to, surfactants, defoamers, biocides, mildewcides, algaecides, thickeners, anti-settling agents, pH buffers, corrosion inhibitors, driers, and/or anti-skinning agents. As explained further below, additives may have a pKa of about 12 or below, about 10 or below, about 8 or below, or about 7 or below. In other approaches, the additives may have a pKa of greater than about 4 to less than about 12 (less than about 10, or less than about 8, or less than about 7), or greater than 6 to less than about 12 (less than about 10, or less than about 8, or less than about 7).

"Glass Transition Temperature" or "Tg" generally refers to a temperature region where an amorphous polymer transitions from a hard, glassy material to a softer, rubbery material. Typically this transition is reversible. Tg is measured by differential scanning calorimetry (DSC) and/or dynamic mechanical analysis (DMA), such as with a TA Instruments Q200 differential scanning calorimeter or the like instrument. Preferably, Tg is measured through DSC.

"Volatile Organic Compound" or "VOC" generally refers to organic compounds that have a high vapor pressure at room temperature. In many cases, VOCs are compounds with a vapor pressure of greater than about 0.1 mm of Hg. VOC as reported herein is measured according to ASTM D2369-90 and is the weight of the VOC per volume of the coating solids in grams/L. As used herein, low VOC or substantially free of VOCs means less than about 50 g/L, in other approaches, less than about 10 g/L, in yet other approaches, less than about 5 g/L, and in yet other approaches, no VOCs.

As used herein, without the need for, without substantial levels of, in the absence of, or substantially free of, or free-of (such as in the context of non-isocyanate or isocyanate free) generally means the coating compositions herein have less than about 1 weight percent, in other approaches, less than about 0.5 weight percent, in other approaches, less than about 0.2 weight percent, less than about 0.1 weight percent, and in yet other approaches, none of the particular component (such as an isocyanate for example).

As used herein, "(meth)acrylate" monomer(s) or monomer unit(s) include both acrylate monomer(s) and monomer unit(s) and methacrylate monomer(s) and monomer unit(s) as well as functionalized (meth)acrylate monomer(s) or monomer unit(s) suitable for incorporation into the functionalized polymers or oligomers disclosed herein. Functional moieties may also bear other crosslinking groups, photo-reactive groups, anti-fouling agents, light absorbers, anti-corrosion agents, and the like as needed for a particular application or use. When a particular monomer is described, it is also intended that the discussion refers to the monomer unit when polymerized within a polymer or oligomer. Likewise, when a monomer unit or repeating unit of a polymer or oligomer is described, the corresponding monomer is also contemplated.

As used herein, "functionalized," "functionality," or "functional group" means a group or moiety of a larger molecule or polymer reactive with another group or atom. For instance, in the context of a dicarbonyl functionalized polymer or oligomer, a functionality of one means a single dicarbonyl moiety, a functionality of two means two dicarbonyl moieties, and so forth. In the context of an alkylidene malonate functionalized polymer or oligomer, a functionality of one means a single alkylidene malonate group, a functionality of two means two alkylidene malonate groups, and so forth.

Turning to more of the specifics, the two-component curable coating compositions herein, which may be water-based, solvent-borne, or solvent-less systems (often depending on the application and molecular weight of the polymers or oligomers), include a first curable component (i) of a beta-dicarbonyl or dicarbonyl functionalized polymer or oligomer and as a second, separate curable component (ii) a alkylidene malonate functionalized polymer or oligomer. Either polymer or oligomer component may further include (meth)acrylate monomer unit(s), vinyl monomer unit(s), vinyl acetate monomer unit(s), acrylic monomer unit(s), styrene monomer unit(s), polyester monomer unit(s), polycarbonate monomer unit(s), polyurethane monomer unit(s), other monomer unit(s) as described below, and/or mixtures thereof as needed for a particular application or use. The dicarbonyl functionalized polymer or oligomer crosslinks via a Michael addition reaction with the alkylidene carbon of the alkylidene functionalized polymer or oligomer to form a cross-linked polymer network.

If the two cure-components are used in a solvent-borne compositions, the solvent may include one or a blend of organic solvents, such as, but not limited to ketone solvents, ester solvents, glycol ether solvents, aromatic solvents, and glycol ether ester solvents. Exemplary, non-limiting examples of solvents that may be useful include xylene, n-butyl acetate, t-butylacetate n-butyl propionate, naptha, ethyl 3-ethoxypropionate, toluene, methyl ethyl ketone (MEK), acetone, methyl propyl ketone (MPK), methyl-n-amyl ketone (MAK), propylene glycol methylether acetate (PMA) and the like.

First Curable Component (i): Dicarbonyl Functionalized Polymer or Oligomer

In one aspect, the curable compositions herein include a dicarbonyl functionalized polymer or oligomer as the first curable component of the two-component system. In one approach or embodiment, the dicarbonyl functionality is provided on select ethylenically unsaturated or vinyl monomer units (or repeat units) of the polymers or oligomers. These vinyl monomers have, in one approach, acetoacetate-derived moieties as side or pendent groups providing the dicarbonyl functionality extending from the vinyl carbons thereon. In other approaches or embodiments, the select dicarbonyl functionalities herein are provided on polyesters, epoxies, or epoxy ester polymers or oligomers. In one particular approach, the dicarbonyl functionality is provided from acetoacetoxyalkyl moieties having the acetoacetate group as a side chain of a main polymer or oligomer backbone as discussed more below. In one particular approach, the dicarbonyl functionality is provided from acetoacetoxyalkyl (meth)acrylate or other vinyl monomers having the acetoacetate group as a side chain thereon as discussed more below. In yet other approaches or embodiments, the dicarbonyl functionality is provided by a monomer or repeat unit of acetoacetoxyethyl (meth)acrylate polymerized into a polymer or oligomer backbone or an acetoacetoxyethyl moiety extending from a polyester, acrylic, cellulosic, epoxy, or epoxy ester polymer or oligomer.

Surprisingly, the particular dicarbonyl functionalized polymers or oligomers selected herein, such as those provided by the acetoacetate-functional moieties, enables a robust curable composition when combined with the alkylidene malonate functionalized polymer or oligomer. This dicarbonyl monomer allows broad latitude in formulation components to achieve isocyanate-free, two-component curable coatings, paints, primers, topcoats, and the like whereby acidic and/or low pKa components can be combined therewith without affecting the Michael reaction cure of the system. The compositions herein exhibit a surprisingly long pot life free from gelling or premature curing and achieve a rapid cure of more than 200 MEK double rubs, for instance, after about 24 hours of ambient cure whereas prior urethane systems often needed several days to often a week or more of cure time to achieve a full cure.

In one embodiment, the first component of the two-component curable system is a polymer or oligomer having a dicarbonyl functionality of 1 or greater as described previously and provided by the moiety of Formula I below:

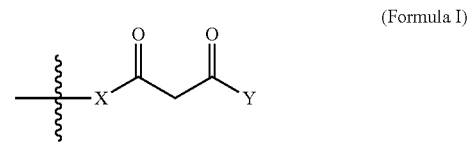

(Formula I)

wherein X is a bivalent linker, such as a heteroatom linker (such as oxygen or nitrogen) to a main polymer or oligomer chain or backbone (in some cases, including a backbone of, but not limited to, vinyl carbons, acrylates, polyesters, or epoxy esters); Y is —$OR_1$ or a C1 to C4 hydrocarbyl group (preferably, a methyl or ethyl group); and $R_1$ a C1 to C20 hydrocarbyl group. In one approach, the structure of Formula I is an acetoacetate-functional pendent group from a polymer or oligomer chain or backbone. In yet other approaches of this embodiment, the dicarbonyl functionality may be provided by the moieties of Formula Ia or Ib:

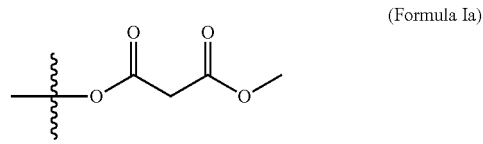

(Formula Ia)

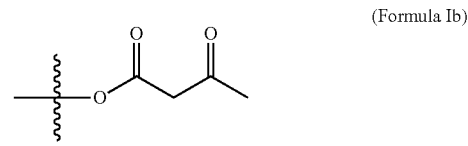

(Formula Ib)

The polymer or oligomer forming the first curable component may have the moiety of Formula I, Ia, or Ib as a side or pendent group extending from a main polymer or oligomer chain or backbone. The main polymer chain may be comprised of or derived from ethylenically unsaturated monomers (or vinyl monomers) that combine to form the polymer or oligomer of the first component. In some approaches, the polymer or oligomer of the first curable component has a structure of Formula II below that includes the dicarbonyl functional moieties of Formula I as a pendent side group:

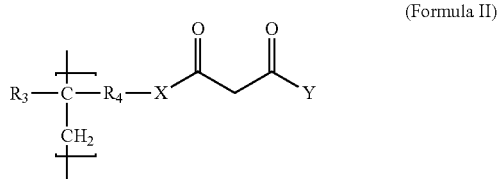

(Formula II)

wherein $R_3$ is a hydrogen, a linear, branched, or cyclic C1 to C4 hydrocarbyl group and $R_4$ is a linear, branched, or cyclic C1 to C4 hydrocarbyl linking group or an ester group of the structure —C(O)OR$_5$— with $R_5$ being a C1 to C4 linear, branched, or cyclic hydrocarbyl group and X and Y are defined above. Monomers suitable to form the polymer or oligomer of Formula II include, but are not limited to, acetoacetoxyethyl (meth)acrylate; acetoacetoxypropyl (meth)acrylate; acetoacetoxybutyl (meth)acrylate; allyl acetoacetate; 2,3-di(acetoacetoxy)propyl methacrylate; and the like, and mixtures thereof.

In yet other approaches, the acetoacetoxy functionality or side chain moiety may be provided from t-butyl-acetoacetate (TBAA), methyl acetoacetate (MAA), ethyl acetoacetate (EAA), acetoacetanilide (AAA), N,N-dimethylacetoacetamide, and/or acetoacetamide reacted with hydroxyl-bearing monomers such as polyesters, acrylics, cellulosics, epoxies, and/or epoxy esters monomer units of the polymer or oligomer of the first component.

In some approaches, the first curable component may have a number average molecular weight of about 200 to 50,000 as measured by gel permeation chromatography using polystyrene as the standard. For instance, the number average molecular weight may range from about 200, from about 500, from about 1,000, from about 5,000, from about 10,000 to about 50,000, about 30,000, about 20,000 and other ranges between such endpoints as needed for a particular application.

In one approach, the compositions herein include about 60 to about 85 weight percent of the first curable component having the dicarbonyl functionality (based on the total weight percent of the first and second curable components). In other approaches, the compositions herein include about 70 to about 80 weight percent of the first curable component (based on the total weight percent of the first and second curable components).

In another approach or embodiment, the compositions herein include about 15 to about 40 weight percent of the first curable component having the dicarbonyl functionality (based on the total weight percent of the first and second curable components). In other approaches, the compositions herein include about 20 to about 30 weight percent of the first curable component (based on the total weight percent of the first and second curable components).

In another approaches, the dicarbonyl functionalized polymers or oligomers of the first curable component may further include optional monomer units polymerized within the polymer or oligomer chain or backbone as needed for a particular application. For instance, the polymer or oligomer may include acrylic monomer units(s), styrene monomer units(s), vinyl acetate monomer units(s), polycarbonate monomer unit(s), polyepoxyester monomer unit(s), polyurethane monomer unit(s) or blends. The polymer or oligomer may include as polymerizable or monomer units in a backbone as vinyl monomers and acrylic monomers such as at least vinyl acetate, alkyl acrylate, alkyl methacrylate, acrylic acid, styrene acrylic, and combinations thereof. Alkyl groups of such monomers may have chain lengths from 1 to 12 carbons and, in some approaches, are methyl, ethyl, propyl, isopropyl, n-butyl, t-butyl and the like side groups.

In other approaches, the vinyl monomers or monomer units are selected from the group consisting of vinyl esters, vinyl aromatic hydrocarbons, vinyl aliphatic hydrocarbons, vinyl alkyl ethers and mixtures thereof. Examples of vinyl esters that may be used include vinyl acetate, vinyl propionate, vinyl laurate, vinyl pivalate, vinyl nonanoate, vinyl decanoate, vinyl neodecanoate, vinyl butyrates, vinyl benzoates, and vinyl isopropyl acetates. Examples of vinyl aromatic hydrocarbons that may be used include styrene, methyl styrenes and other lower alkyl styrenes, chlorostyrene, vinyl toluene, vinyl naphthalene and divinyl benzene. Examples of vinyl aliphatic hydrocarbons that may be used include vinyl chloride and vinylidene chloride as well as alpha olefins such as ethylene, propylene, isobutylene, as well as conjugated dienes such as 1,3 butadiene, methyl-2-butadiene, 1,3-piperylene, 2,3-dimethyl butadiene, isoprene, cyclohexene, cyclopentadiene, and dicyclopentadiene. Examples of vinyl alkyl ethers that may be used include methyl vinyl ether, isopropyl vinyl ether, n-butyl vinyl ether, and isobutyl vinyl ether.

In other approaches, acrylic monomers or monomer units suitable for use in the polymers or oligomers of the present disclosure include any compounds having acrylic functionality. Preferred acrylic monomers are selected from the group consisting of alkyl (meth)acrylates, acrylic acids, as well as aromatic derivatives of (meth)acrylic acid, acrylamides and acrylonitrile. Typically, the alkyl (meth)acrylate monomers (also referred to herein as "alkyl esters of (meth) acrylic acid") will have an alkyl ester portion containing from 1 to 12, preferably about 1 to 5, carbon atoms per molecule.

Suitable acrylic monomers or monomer units include, for example, methyl (meth)acrylate, ethyl (meth)acrylate, butyl (meth)acrylate, propyl (meth)acrylate, 2-ethyl hexyl (meth) acrylate, cyclohexyl (meth)acrylate, decyl (meth)acrylate, isodecyl (meth)acrylate, benzyl (meth)acrylate, isobornyl (meth)acrylate, neopentyl (meth)acrylate, 1-adamatyl methacrylate and various reaction products such as butyl, phenyl, and cresyl glycidyl ethers reacted with (meth)acrylic acid, amino (meth)acrylates, as well as acrylic acids such as (meth)acrylic acid, ethacrylic acid, alpha-chloroacrylic acid, alpha-cycanoacrylic acid, crotonic acid, beta-acryloxy propionic acid, and beta-styryl acrylic acid.

Other examples of suitable (meth)acrylate monomers or monomer units include, but are not limited to, alkyl (meth) acrylates, including methyl methacrylate, butyl acrylate, 2-ethylhexylacrylate, C12/C18 alkylacrylate, polyethyleneglycol acrylate or diacrylate, acetoacetoxyethyl acrylates, diacetone acyl halides, benxophenone (meth) acrylates, etc. Additionally, vinylic monomers or other monomers may be functionalized or bear functional moieties that are utilized in post application functions, such as cross-linking, light or heat induced grafting.

Second Curable Component (ii): Alkylidene Malonate Functionalized Polymer or Oligomer In another aspect, the curable compositions herein include an alkylidene malonate functionalized polymer or oligomer as the second, separate curable component of the two-component system. In one approach, the second component is a polyester based polymer or oligomer including one or more of the alkylidene malonate moieties within a polymer chain. In another approach, the polyester based polymer or oligomer of the second curable component has one or more repeating units of Formula III below:

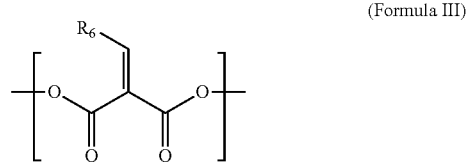

(Formula III)

wherein $R_6$ is hydrogen, an alkyl group (such as a C1 to C9 linear or branched alkyl group or a C1 to C6 linear or branched alkyl group), or an aryl group. The polyester polymer or oligomer of the second curable component may include any number of the functionalized moieties of Formula III and may optionally include bivalent linking groups or atoms connecting the various functionalized moieties. For example, the bivalent linking groups may be alkylene groups, heteroatoms, bivalent aryl or aromatic groups, or any combinations thereof as needed for a particular application.

In some approaches, the second curable component may be a polymer or oligomer having a number average molecular weight of about 100 to about 5,000 depending on the particular application. In other approaches, the second curable component may also include dihydrocarbyl dicarboxylates such as aromatic dicarboxylates, aliphatic dicarboxylates, cycloaliphatic dicarboxylates and/or a dicarboxylates containing two different two different hydrocarbyl groups selected from aromatic, aliphatic, and cycloaliphatic. Polymers or oligomers having the alkylidene malonate moieties suitable for the present disclosure maybe produced, for example, as described in U.S. Pat. No. 8,609,885 and related patents and publications, which are incorporated herein by reference. Suitable alkylidene malonate monomers may be prepared by reacting malonic acid esters with formaldehyde or higher aldehyde as needed for a particular application.

In one approach, the compositions herein include about 15 to about 40 weight percent of the second curable component having the alkylene malonate moieties (based on the first and second curable components). In other approaches, the compositions herein include about 20 to about 30 weight percent of the second curable component (based on the first and second curable components). In some approaches, the combination includes an excess of the first curable component, such as a ratio of the first curable component to the second curable component of about 2:1 to about 4:1, and in other approaches, about 3:1

In yet another approach, the compositions herein include about 60 to about 85 weight percent of the second curable component having the alkylene malonate moieties (based on the first and second curable components). In other approaches, the compositions herein include about 70 to about 80 weight percent of the second curable component (based on the first and second curable components). In some approaches, the combination includes an excess of the first curable component, such as a ratio of the first curable component to the second curable component of about 1:2 to about 1:4, and in other approaches, about 1:3

Initiator or Catalyst

The catalyst or initiator is preferably a polymeric material or a compound having a pKa of about 12 or less (in other approaches, about 10 or less, and in yet other approaches, about 8 or less and, in some approaches, greater than 7 or greater than 8) and may be part of a polymer or oligomer. When the initiator or catalyst is a polymer or oligomer, it may cure within the polymeric matrix. In some examples, suitable initiators or catalysts may be selected from compounds, polymers, or oligomers including or having as moieties within guanidines, amidines, hydroxides, alkoxides, oxides, tertiary amines, alkali metal carbonates, alkali metal bicarbonates, alkali metal phosphates, alkali metal hydrogen phosphates, phosphines, alkali metal salts of carboxylic acids, alkali silicates, tetra methyl guanidine (TMG), 1,8-Diazabicyclo(5.4.0)undec-7-ene (DBU), 1,5-Diazabicyclo(4.3.0)non-5-ene (DBN), 1,4 diazabicyclo(2.2.2)octane (DABCO), tertiary butyl ammonium hydroxide (TBAH), sodium hydroxide, potassium hydroxide, sodium methoxide, sodium ethoxide, tri potassium phosphate, calcium oxide, triethylamine, sodium carbonate, potassium carbonate, sodium bicarbonate, potassium bicarbonate, potassium hydrogen phosphate (mono-basic and di-basic), triphenyl phosphine, triethyl phosphine, sodium silicate, potassium acetate, potassium acrylate, potassium octanoate, and the like and combinations thereof.

Acidic Components

Surprisingly, even though Michael addition reactions typically require strongly basic conditions (or basic substrates) for reaction initiation, the unique selection of the two curable components discussed herein permit a wide latitude in formulation componentry and suitable substrates for application permitting even low pKa additives to be included in the compositions. For instance, paints, coatings, topcoats, varnishes, and other such compositions commonly include additional additives that have a low pKa, which would typically poison common Michael addition reactions. However, due to the unique cure components selected herein, acidic additives can be combined with the selected two cure components herein and still achieve good pot life and cure characteristics.

One example of an acidic additives suitable for the compositions herein includes the addition of a volatile and/or non-volatile acids to adjust, for instance, pot-file and/or cure properties. Examples of the volatile acid that may be included within the curable compositions herein are acids having a pKa below 7 (or below 6, or below 5), such as acetic acid (pKa of about 4.7), propionic acid (pKa of about 4.9), and the like and mixtures thereof. Additionally, non-volatile acids may also be added to the compositions herein as needed for a particular application or functionality without affecting cure properties. Examples of non-volatile acids may include benzoic acid (pKa of about 4.2), ethylhexanoic acid (pKa of about 4.8), and the like acids, and combinations thereof. If included, the compositions may include about 2 to about 15 weight percent of such acids (in other approaches, about 5 to about 10 weight percent) having a pKa ranging from about 3 or greater, about 4 or greater, about 5 or greater, or about 6 or greater, to about 12 or less, about 10 or less, about 8 or less, or about 7 or less, about 6 or less, or about 5 or less.

Another example of an additive having an acidic nature now suitable for the two-component curable compositions herein are surface treated pigments. Coatings, paints, varnishes, and other applications often include organic and, preferably, inorganic pigments. In many instances, these pigments are surface treated or conditioned such that they have acidic characteristics.

Suitable pigment particles or inorganic particles used in the compositions of the present disclosure may be titanium dioxide ($TiO_2$), zinc oxide ($ZnO_2$), calcium carbonate ($CaCO_3$), talc, clay materials, aluminum oxide, silicon dioxide, magnesium oxide, zinc sulfate, sodium oxide, potassium oxide, combinations thereof, or other known pigment or inorganic particles suitable for paints and other coatings. In some approaches, the pigment or inorganic particle is titanium dioxide, which may comprise anatase titanium dioxide or rutile titanium dioxide, or a mixture of the two. In other approaches, the pigment or inorganic particle comprises rutile titanium dioxide, to the exclusion of anatase titanium dioxide. In some approaches, the rutile titanium dioxide is surface treated with an inorganic oxide, such as silica ($SiO_2$). Generally, titanium dioxide has a particle size of from about 0.2 to about 0.3 microns in diameter and is provided in powder form, or in an aqueous slurry. An example of a titanium dioxide that is suitable for use in the present invention is Ti-Pure® R-706, which is commercially available from E.I. du Pont de Nemours and Company. Ti-Pure® R-706 titanium dioxide is a rutile titanium dioxide that is surface treated with silica. Pigment or pigment particles include both organic, inorganic, and extender pigment particles. For example, titanium dioxide, zinc oxide, magnesium oxide, and potassium oxide are examples of inorganic pigment particles; clay, aluminum silicate, silicon, calcium carbonate, and talc, magnesium silicate, silicon dioxide are often considered extender pigment particles; and opaque polymers as discussed previously may be considered inorganic pigment particles. Depending on the type of coating, the PVC of the coating may be less than about 80, in other approaches, about 35 to about 80, in other approaches, about 60 to about 75, in other approaches, about 30 to about 50, and in yet other approaches, about 20 to about 50.

For example, titanium dioxide pigments may be coated with alumina/silica to improve the pigment physical properties and also to reduce the chemical activity of the titania surface. This alumina/silica coating on titania pigments is acidic. During production of titanium dioxide, strong acids, such as sulfuric acid are often used. Thus, there may be residual acids on the surface of the particle.

Yet another class of low or lower pKa additives that are now suitable for the Michael addition-based, two-component compositions herein are UV absorbers such as photopolymerizable and/or non-photopolymerizable UV absorbers, such as benzotriazole-based UV absorbers. Suitable UV absorbers are described in U.S. Pat. No. 5,559,163 and may include UV absorbers belonging to the group of photopolymerizable hydroxybenzophenones and photopolymerizable benzotriazoles. Examples of such UV absorbers include 2-hydroxy-4-acryloyloxyethoxy benzophenone, 2-hydroxy-4-(2 hydroxy-3-methacrylyloxy) propoxybenzophenone, or photopolymerizable benzotriazoles. Other photopolymerizable UV absorbers that may be used in the coating composition of the present disclosure include photopolymerizable, ethylenically unsaturated triazines, salicylates, aryl-substituted acrylates and polymerizable versions of other effective UV absorbers, and mixtures of these UV absorbers. Additionally, non-polymerizable UV absorbers can also be used the compositions of the present disclosure without affecting the Michael addition cure. For example, non-polymerizable UV absorbers include benzotriazoles, benzophenones, substituted acrylates, and salicylates. Representative non-polymerizable UV absorbers include, but are not limited to 2-(2'-hydroxy-5'-methylphenyl) benzotriazole; 2-(3',5'-dialkyl-2'-hydroxy-phenyl)benzotriazole; 2-(3'-tert-butyl-2'-hydroxy-5-methylphenyl)-5-chlorobenzotriazole; 2-(3',5'-di-tert-butyl-2'-hydroxyphenyl)-5-chloro-benzotriazole; 2-(3', 5'-dialkyl-2'hydroxy-phenyl)benzotriazole; 2-(2-hydroxy-3, 5-di(1,1-dimethylbenzyl)phenyl)-2H-benzotriazole, and the like UV absorbers. Other useful polymerizable and non-polymerizable UV absorbers are listed in U.S. Pat. No. 4,636,408 or 5,559,163, which are both incorporated herein by reference. If used, the amount of UV absorber in the compositions herein may be about 0.5 to about 20 weight of the weight of the total composition and, in other approaches, about 4 to about 15 weight of the weight of the total composition. In some approaches, such UV absorber additive in the compositions herein may have a pKa of about 10 or below, preferably below 10.

In some approaches, the compositions herein are also suitable for application to substrates having an acidic surface nature or an acidic surface content. For example, the compositions herein may be applied to and form the good chemical resistance and cure as discussed herein when applied to wood or other cellulose substrates having a tannin content and/or tannic acid content.

Other Additives

The compositions herein may also include any other suitable additives as needed for the particular composition. Examples include flow agents or enhancers, wetting agents, surfactants, defoamers, biocides, plasticizers, silicone fluids, mildewcides, algaecides, thickeners, anti-settling agents, pH buffers, corrosion inhibitors, driers, and/or anti-skinning agents. Those of skill will appreciate the additives needed for the particular application.

Composition Properties

In yet other approaches, the compositions herein may include about 60 to about 80 weight percent of the first component having the dicarbonyl functionality and about 20 to about 40 weight percent of the second component having the alkylidene malonate functionality based on the first and second component. In some approaches, the compositions have an excess of the dicarbonyl functionality, such as a ratio of the dicarbonyl functionality to the alkylidene malonate functionality ranging from about 2:1 or greater, about 3:1 or greater, or about 4:1 or greater. In other approaches, the excess of the dicarbonyl functionality ranges from about 2:1 or greater, about 3:1 or greater, or about 4:1 or greater to less than about 6:1, less than about 5:1, or less than about 3:1. In yet other approaches, the dicarbonyl functionality is about 3 times that of the alkylidene malonate functionality.

In yet other approaches, the compositions herein may include about 20 to about 40 weight percent of the first component having the dicarbonyl functionality and about 60 to about 80 weight percent of the second component having the alkylidene malonate functionality based on the first and second component. In some approaches, the compositions have a ratio of the dicarbonyl functionality to the alkylidene malonate functionality ranging from about 1:2 or greater, about 1:3 or greater, or about 1:4 or greater. In other approaches, a ratio of these components is about 1:2 or greater, about 1:3 or greater, or about 1:4 or greater to less than about 1:6, less than about 1:5, or less than about 1:3. In yet other approaches, the dicarbonyl functionality is about 1/3 times that of the alkylidene malonate functionality.

When the cure reaction is initiated, the first cure component of the dicarbonyl functionalized polymer or monomer (and preferably the beta carbon thereof) reacts with an alkylidene carbon of the second cure component to form a cross linked polymer or cross-linked polymer matrix. An exemplary reaction scheme of a cross-linked polymer or oligomer may have the structure below:

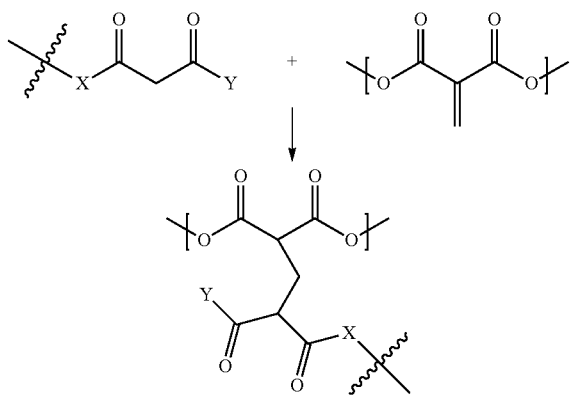

The curable compositions herein, such as non-isocyanate curable compositions, including the unique two-component system suitable for a Michael reaction in the presence of low pKa additives maintains desired properties for coatings, paints, topcoats, primers, and the like. For example, the compositions evidence a good pot life. Additionally, when cured, the compositions often resist more than 200 MEK double rubs only after several hours of ambient cure, such as after about 24 hours of ambient cure (such as through testing as set forth in ASTM 4752, ASTM 5402, and the like tests). This rapid cure is unexpected because even prior isocyanate-containing polyurethanes did not achieve such level of cure for several days and often a week or more of cure.

Additionally, the compositions herein have the capability to perform desired gloss, adhesion, dry time, harness, impact resistance, and flexibility as needed for the desire coating application.

Other Monomers or Polymers

The various polymers or oligomers of the two-component cure system herein (or other polymer of the present disclosure) may include other optional monomer units polymerized into the polymer or oligomer chain or backbone (of either the first cure component or the second cure component) or as additional, separate polymers as needed for a particular application. For instance, the backbone including the functionalized polymers or oligomers herein (or a separate polymer) may further include ureido monomers, amino monomers, sulfonate monomers or surfactants, silane monomers, phosphate monomers or surfactants, carboxyl monomers or surfactants, and combinations thereof. In some approaches, the copolymer may further include vinyl monomers such as allyl imidazolidinone, allyl acetoacetates, allyl epoxies, epoxy acrylates, carbonyl monomers, other sulfonates, other phosphonates, vinyl phosphonate, allyl hydroxypopyl sodium sulfonate, allyloxy hydroxypropyl sodium sulfonate, and combinations thereof as needed for a particular application.

In some approaches, for instance, the other optional monomers in a polymer, copolymer, or terpolymer of the present disclosure, if included, may be in amounts up to about 10 weight percent, and in other approaches, about 0.1 to about 5 weight percent, in other approaches, about 0.5 to about 2 weight percent, but the amounts may vary depending on the particular application. In other approaches, the other or additional monomers may each be included in a polymer backbone in amounts less than about 1 weight percent.

EXAMPLES

The following examples demonstrate the preparation of polymers and paint compositions such as those described hereinabove. The examples are intended to be representative of the polymers and compositions that can be made and are not intended to limit the scope of the present disclosure to the specific illustrative examples disclosed below. All percentages, ratios, and amounts in this disclosure and Examples are by weight unless otherwise specified.

Comparative Example 1

A comparative polymer was produced using the following procedure: to a 2 liter, four neck, round bottom flask equipped with an agitator, condenser, nitrogen inlet, heating mantle, thermocouple and temperature controller, 188.7 grams of toluene was charged and heated to 105° C. under a nitrogen blanket. A mixture of 175.0 grams of methyl methacrylate, 300.0 grams of n-butyl methacrylate, 25.0 grams of 2-ethylhexyl acrylate, 2.2 grams of 2,2'-azodi(2-methylbutyronitrile), and 25.5 grams of toluene was added to the flask over a period of 180 minutes and held at 105° C. for an additional 60 minutes. A mixture of 0.2 grams of 2,2'-azodi(2-methylbutyronitrile) and 8.8 grams of toluene was added to the flask over a period of 15 minutes and held at 105° C. for an additional 180 minutes. The resulting acrylic copolymer was cooled below 50° C. and 111.3 grams of toluene and 167.4 grams of methyl ethyl ketone were added to the flask to reduce the viscosity of the copolymer solution.

Example 2

An inventive polymer was produced using the following procedure: to a 2 liter, four neck, round bottom flask equipped with an agitator, condenser, nitrogen inlet, heating mantle, thermocouple and temperature controller, 188.7 grams of toluene was charged and heated to 105° C. under a nitrogen blanket. A mixture of 212.5 grams of methyl methacrylate, 62.0 grams of n-butyl methacrylate, 25 grams of 2-ethylhexyl acrylate, 200.5 grams of acetoacetoxy ethyl methacrylate, 2.2 grams of 2,2'-azodi(2-methylbutyronitrile), and 25.5 grams of toluene was added to the flask over a period of 180 minutes and held at 105° C. for an additional 60 minutes. A mixture of 0.2 grams of 2,2'-azodi(2-methylbutyronitrile) and 8.8 grams of toluene was added to the flask over a period of 15 minutes and held at 105° C. for an additional 180 minutes. The resulting acrylic copolymer was cooled below 50° C. and 111.3 grams of toluene and 167.4 grams of methyl ethyl ketone were added to the flask to reduce the viscosity of the copolymer solution.

Example 3

The polymers of Example 1 (Comparative) and Example 2 (Inventive) were prepared into two-component formulations including Component A and Component B as follows:

TABLE 1

| Component A | |
|---|---|
| Acrylic copolymer from either Polymer Example 1 or 2 | 37.5 grams |
| Butanediol di(methylene malonate) oligomer | 6.3 grams |
| Acetic acid | 1.9 grams |
| n-Butyl acetate | 18.8 grams |

TABLE 2

| Component B | |
|---|---|
| 1,4-diazabicyclo[2.2.2]octane | 5.0 grams |
| Toluene | 95.0 grams |

To combine Component A and Component B, five drops of Component B was added to 64.5 grams of Component A, mixed, applied with a draw down blade at 5 mils (wet) thickness over a steel panel coated with a cured automotive grade electrodeposition primer and allowed to cure at ambient temperature. The gel-time of the mixtures was greater than two hours.

After 24 hours, cure was determined by methyl ethyl ketone double rubs; the number of double rubs from a methyl ethyl ketone soaked paper towel to cause a change in film appearance. The results are provided in Table 3

TABLE 3

| MEK Double Rubs | |
|---|---|
| Formulation based on Polymer Example 1 | 39 double rubs |
| Formulation based on Polymer Example 2 | >200 double rubs |

The polymer of comparative Example 1 does not have any functional groups to react with the butanediol di(methylene malonate) oligomer. Any cross-linking reactions of the polymer of comparative Example 1 that occurred when Component B was added are those that occur from the homopolymerization of the Butanediol di(methylene malonate) oligomer. This lack of co-reaction between the two polymers resulted in only 39 double rubs from the methyl ethyl ketone double rubs test.

The polymer of inventive Example 2 had pendant acetoacetate groups available to react with the butanediol di(methylene malonate) oligomer. If no or a limited cross-linking reaction occurred between these two polymers, one would expect the methyl ethyl ketone double rubs of the cured film to be similar to those of the polymer of the comparative Example 1 based coating. However, unexpectedly, the greater than 200 methyl ethyl ketone double rubs of the cured film from the inventive polymer of the Example 2 based coating indicated that a cross-linking reaction between the pendant acetoacetate groups on polymer Example 2 and the butanediol di(methylene malonate) oligomer had occurred.

Unless otherwise specified, all measurements herein are made at 23±1° C. and 50% relative humidity. All publications, patent applications, and issued patents mentioned herein are hereby incorporated in their entirety by reference. Citation of any reference is not an admission regarding any determination as to its availability as prior art to the claimed invention.

The dimensions and values disclosed herein are not to be understood as being strictly limited to the exact numerical values recited. Instead, unless otherwise specified, such as dimension is intended to mean both the recited value and a functionally equivalent range surrounding that value. All ranges noted are intended to mean any endpoint within that range. For example, a dimension disclosed as "40 mm" is intended to mean "about 40 mm".

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values. It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, an exemplary range from 1 to 4 disclosed herein also means a range from 1 to 3, 1 to 2, 2 to 4, 2 to 3, and so forth is disclosed herein.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

Illustrative embodiments have been described, hereinabove. It will be apparent to those skilled in the art that the above devices and methods may incorporate changes and modifications without departing from the general scope of this disclosure. It is intended to include all such modifications and alterations within the scope of the present disclosure. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A curable composition comprising:
   (i) a first cure component of a polymer or oligomer having a dicarbonyl functionality of 1 or greater provided by a moiety on the polymer or oligomer having the structure of Formula (I)

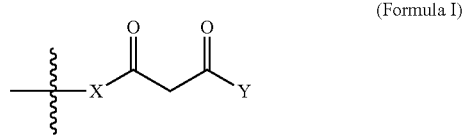

(Formula I)

wherein
   X is a heteroatom linker or organic group to a polymer or oligomer backbone;
   Y is —OR$_1$ or a —C1 to —C4 hydrocarbyl group; and
   R$_1$ is a C1 to C20 hydrocarbyl group;
   (ii) a second cure component of another polymer or oligomer having an alkylidene malonate functionality of 1 or greater provided by the structure of Formula (III)

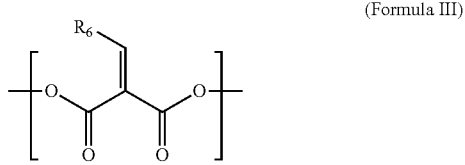
(Formula III)

wherein $R_6$ is hydrogen, a C1 to C9 alkyl group, or an aryl group; and
a catalyst or initiator;
about 5 to about 15 weight percent of an acid; and
wherein the curable composition includes additives having a pKa of about 7 or less.

2. The curable composition of claim 1, wherein the dicarbonyl structures are selected from the moieties of Formula (Ia), Formula (Ib), or mixtures thereof:

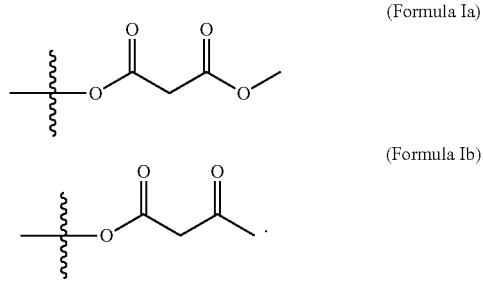

(Formula Ia)

(Formula Ib)

3. The curable composition of claim 1, wherein the first cure component is a polymer or oligomer having the structure of Formula (II):

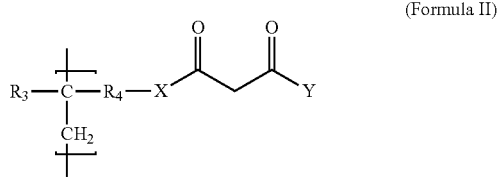

(Formula II)

wherein
$R_3$ is hydrogen or a linear, branched, or cyclic C1 to C4 hydrocarbyl group;
$R_4$ is a linear, branched, or cyclic C1 to C4 hydrocarbyl linking group or an ester group of the structure —C(O)OR$_5$— with $R_5$ being a C1 to C4 linear, branched, or cyclic hydrocarbyl group.

4. The curable composition of claim 1, wherein monomers to form the polymer or oligomer forming the first cure component are selected from the group consisting of acetoacetoxyethyl (meth)acrylate; acetoacetoxypropyl (meth)acrylate; acetoacetoxybutyl (meth)acrylate; allyl acetoacetate; 2,3-di(acetoacetoxy)propyl methacrylate; and mixtures thereof.

5. The curable composition of claim 1, wherein the alkylidene malonate functionality of the second cure component has the structure:

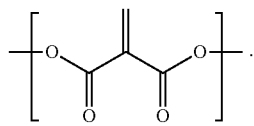

6. The curable composition of claim 1, wherein the polymer or oligomer having the dicarbonyl functionality further includes acrylic monomer units, vinyl monomer units, polyester monomer units, polycarbonate monomer units, polyepoxyester monomer units, polyurethane monomer units, or mixtures thereof.

7. The curable composition of claim 1, wherein the polymer or oligomer having the alkylidene malonate monomer is a condensation product of diethyl methylene malonate and 1,4-butanediol.

8. The curable composition of claim 1, wherein the catalyst or initiator is polymeric, oligomeric, or a compound.

9. The curable composition of claim 1, wherein the catalyst or initiator is a compound selected from the group consisting of guanidines, amidines, hydroxides, alkoxides, oxides, tertiary amines, alkali metal carbonates, alkali metal bicarbonates, alkali metal phosphates, alkali metal hydrogen phosphates, phosphines, alkali metal salts of carboxylic acids, alkali silicates, tetra methyl guanidine (TMG), 1,8-Diazabicyclo(5.4.0)undec-7-ene (DBU), 1,5-Diazabicyclo (4.3.0)non-5-ene (DBN), 1,4 diazabicyclo (2.2.2)octane (DABCO), tertiary butyl ammonium hydroxide (TBAH), sodium hydroxide, potassium hydroxide, sodium methoxide, sodium ethoxide, tri potassium phosphate, calcium oxide, triethylamine, sodium carbonate, potassium carbonate, sodium bicarbonate, potassium bicarbonate, potassium hydrogen phosphate (mono-basic and di-basic), triphenyl phosphine, triethyl phosphine, sodium silicate, potassium acetate, potassium acrylate, potassium octanoate, and combinations thereof.

10. The curable composition of claim 1, wherein the catalyst or initiator has a pKa of about 12 or less.

11. The curable composition according to claim 1, wherein the acid is added to adjust pot-life and/or cure properties.

12. The curable composition of claim 1, wherein the acid is selected from acetic acid, propionic acid, benzoic acid, ethylhexanoic acid, or combinations thereof.

13. The curable composition of claim 1, further comprising organic pigments, inorganic pigments, or combinations thereof.

14. The curable composition of claim 13, wherein the organic pigments have an acidic surface treatment.

15. The curable composition of claim 1, further comprising components having a pKa between 3 and about 6.

16. The curable composition of claim 1, when cured, further comprising over about 200 MEK double rubs after about 24 hours of ambient cure.

17. The curable composition of claim 1, further including inorganic pigments having an acidic surface treatment.

18. The curable composition of claim 1, further including benzotriazole-based UV absorbers.

19. The curable composition of claim 1, wherein the curable composition is applied to a substrate having an acidic surface.

* * * * *